United States Patent
Takayama et al.

(10) Patent No.: US 10,112,267 B2
(45) Date of Patent: *Oct. 30, 2018

(54) FLUX-CORED WIRE FOR AR—$CO_2$ MIXED GAS SHIELDED ARC WELDING

(71) Applicant: NIPPON STEEL & SUMIKIN WELDING CO., LTD., Tokyo (JP)

(72) Inventors: Rikiya Takayama, Tokyo (JP); Kiyohito Sasaki, Tokyo (JP); Yasuhito Totsuka, Tokyo (JP); Masaaki Toriyabe, Tokyo (JP)

(73) Assignee: NIPPON STEEL & SUMIKIN WELDING CO., LTD., Tokyo (JP)

( * ) Notice: Subject to any disclaimer, the term of this patent is extended or adjusted under 35 U.S.C. 154(b) by 260 days.

This patent is subject to a terminal disclaimer.

(21) Appl. No.: 14/993,844

(22) Filed: Jan. 12, 2016

(65) Prior Publication Data

US 2016/0207150 A1    Jul. 21, 2016

(30) Foreign Application Priority Data

Jan. 16, 2015 (JP) ................................. 2015-006635

(51) Int. Cl.
*B23K 35/02* (2006.01)
*B23K 35/30* (2006.01)
(Continued)

(52) U.S. Cl.
CPC ............ *B23K 35/0266* (2013.01); *B23K 9/00* (2013.01); *B23K 35/02* (2013.01); *B23K 35/30* (2013.01);
(Continued)

(58) Field of Classification Search
CPC .............. B23K 35/362; B23K 35/3073; B23K 35/3602; B23K 35/361; B23K 35/3608;
(Continued)

(56) References Cited

U.S. PATENT DOCUMENTS 3,843,867 A * 10/1974 Helton ............... B23K 35/3608
219/137 R
4,510,374 A *  4/1985 Kobayashi ......... B23K 35/0266
219/146.1

(Continued)

FOREIGN PATENT DOCUMENTS

JP       09262693 A     10/1997
JP       09277087 A     10/1997
(Continued)

OTHER PUBLICATIONS

Related U.S. Appl. No. 14/994,947; First Named Inventor: Takayama Rikiya; Title: "Flux-Cored Wire for Carbon Dioxide Gas Shielded Arc Welding"; Filed: Jan. 13, 2016.
(Continued)

*Primary Examiner* — Jimmy Chou
(74) *Attorney, Agent, or Firm* — Holtz, Holtz & Volek PC

(57) ABSTRACT

A wire including, in terms of % by mass with respect to a total mass of the wire, as a total in a steel outer skin and a flux, 0.03 to 0.08% of C, 0.1 to 0.6% of Si, 1.2 to 2.5% of Mn, 0.01 to 0.5% of Cu, 0.5 to 1.5% of Ni, 0.05 to 0.5% of Ti, 0.002 to 0.015% of B, and 0.05% or less of Al, and further including, in the flux, 4 to 8% in terms of $TiO_2$, 0.1 to 0.6% of in terms of $SiO_2$, 0.02 to 0.3% in terms of $Al_2O_3$, 0.1 to 0.8% of Mg, 0.05 to 0.3% in terms of F, 0.05 to 0.3% in terms of Na and K in a fluorine compound, 0.05 to 0.2% of $Na_2O$ and $K_2O$, and 0.2% or less in terms of $ZrO_2$.

2 Claims, 1 Drawing Sheet

(51) Int. Cl.
| | |
|---|---|
| *B23K 35/36* | (2006.01) |
| *B23K 35/362* | (2006.01) |
| *B23K 35/38* | (2006.01) |
| *C22C 38/00* | (2006.01) |
| *C22C 38/02* | (2006.01) |
| *C22C 38/04* | (2006.01) |
| *C22C 38/08* | (2006.01) |
| *C22C 38/14* | (2006.01) |
| *B23K 9/00* | (2006.01) |
| *B23K 35/368* | (2006.01) |
| *C22C 38/06* | (2006.01) |
| *C22C 38/16* | (2006.01) |

(52) U.S. Cl.
CPC ...... *B23K 35/3053* (2013.01); *B23K 35/3073* (2013.01); *B23K 35/361* (2013.01); *B23K 35/362* (2013.01); *B23K 35/3602* (2013.01); *B23K 35/3605* (2013.01); *B23K 35/3607* (2013.01); *B23K 35/3608* (2013.01); *B23K 35/368* (2013.01); *B23K 35/38* (2013.01); *C22C 38/002* (2013.01); *C22C 38/02* (2013.01); *C22C 38/04* (2013.01); *C22C 38/06* (2013.01); *C22C 38/08* (2013.01); *C22C 38/14* (2013.01); *C22C 38/16* (2013.01)

(58) Field of Classification Search
CPC ............ B23K 35/3607; B23K 35/3616; C22C 38/16; C22C 38/14
USPC ........... 219/69.1, 73, 145.22, 145.23, 146.22
See application file for complete search history.

(56) References Cited

U.S. PATENT DOCUMENTS

| | | | | |
|---|---|---|---|---|
| 5,099,103 A * | 3/1992 | Yamada | ............. | B23K 35/3608 219/145.22 |
| 5,219,425 A * | 6/1993 | Nishikawa | ......... | B23K 35/3608 219/145.22 |
| 5,903,814 A * | 5/1999 | Miura | ................ | B23K 35/3608 148/24 |
| 6,140,607 A * | 10/2000 | Kamada | ............. | B23K 35/3608 148/24 |
| 6,367,686 B1 * | 4/2002 | Abriles | ................ | B23K 35/025 148/23 |
| 6,833,530 B2 | 12/2004 | Kim | | |
| 7,170,032 B2 * | 1/2007 | Flood | .................... | B23K 9/167 219/137 R |
| 7,491,910 B2 * | 2/2009 | Kapoor | ............... | B23K 35/0261 219/145.1 |
| 8,153,935 B2 * | 4/2012 | Jang | .................. | B23K 35/0266 219/145.22 |
| 9,770,789 B2 * | 9/2017 | Saruwatari | ......... | B23K 35/3066 |
| 2003/0094444 A1 * | 5/2003 | Kato | .................. | B23K 35/3608 219/145.22 |
| 2004/0020912 A1 * | 2/2004 | Hara | .................. | B23K 35/3053 219/145.22 |
| 2008/0057341 A1 * | 3/2008 | Bouillot | ................. | B23K 9/025 428/685 |
| 2012/0234814 A1 * | 9/2012 | Tseng | ................... | B23K 35/025 219/145.22 |
| 2012/0241432 A1 * | 9/2012 | Lin | .................... | B23K 35/3602 219/145.22 |
| 2012/0241433 A1 * | 9/2012 | Kojima | .................. | B23K 35/02 219/145.22 |
| 2013/0294819 A1 * | 11/2013 | Menon | ............... | B23K 35/0261 403/270 |
| 2014/0061179 A1 * | 3/2014 | Barhorst | ............ | B23K 35/3612 219/145.22 |
| 2014/0097168 A1 * | 4/2014 | Ferree | ................ | B23K 35/3026 219/145.22 |
| 2014/0349136 A1 * | 11/2014 | Barhorst | ............ | B23K 35/3053 428/684 |
| 2014/0353288 A1 * | 12/2014 | Amata | ............... | B23K 35/0261 219/74 |
| 2015/0360327 A1 * | 12/2015 | Nakamura | ......... | B23K 35/3053 403/272 |

FOREIGN PATENT DOCUMENTS

| | | |
|---|---|---|
| JP | 2002361486 A | 12/2002 |
| JP | 2005319508 A | 11/2005 |
| JP | 2006095550 A | 4/2006 |
| JP | 2008087043 A | 4/2008 |
| JP | 2009061474 A | 3/2009 |
| JP | 2009248137 A | 10/2009 |
| JP | 2013226577 A | 11/2013 |
| JP | 2014113615 A | 6/2014 |

OTHER PUBLICATIONS

U.S. Appl. No. 14/994,947, filed Jan. 13, 2016.
U.S. Appl. No. 15/299,065, filed Oct. 20, 2016.
U.S. Appl. No. 15/352,267, filed Nov. 15, 2016.
U.S. Appl. No. 15/099,094, filed Apr. 14, 2016.
Related U.S. Appl. No. 14/994,947; First Named Inventor: Rikiya Takayama; Title "Flux-Cored Wire For Carbon Dioxide Gas Shielded Arc Welding"; Filed: Jan. 13, 2016.
Related U.S. Appl. No. 15/299,065; First Named Inventor: Rikiya Takayama; Title: "Flux-Cored Wire For Carbon Dioxide Gas Shielded Arc Welding"; Filed: Oct. 20, 2016.
Related U.S. Appl. No. 15/352,267; First Named Inventor: Kiyohito Sasaki; Title: "Flux-Cored Wire For Ar-CO2 Mixed Gas Shielded Arc Welding"; Filed: Nov. 15, 2016.
Related U.S. Appl. No. 15/099,094; First Named Inventor: Yuki Kayamori; Title: "Flux-Cored Wire For Gas-Shielded Arc Welding"; Filed: Apr. 14, 2016.

* cited by examiner

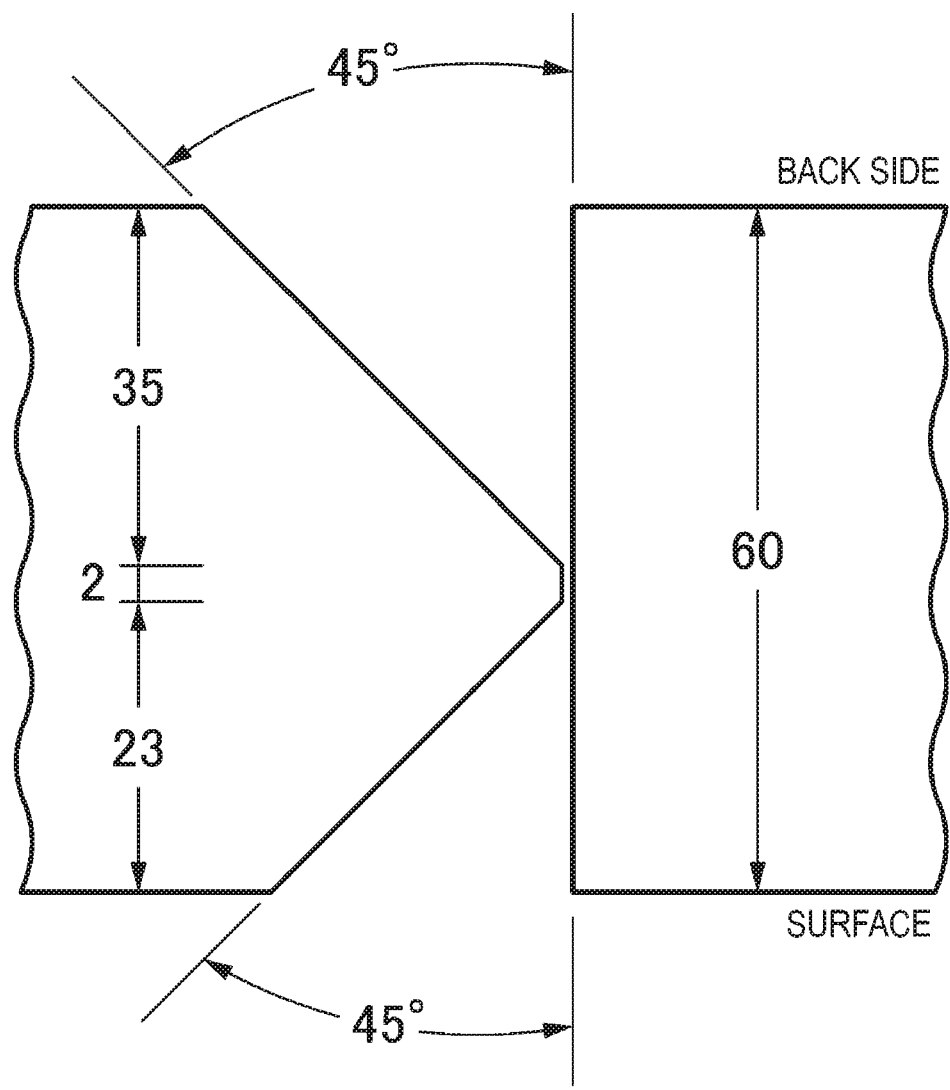

FLUX-CORED WIRE FOR AR—$CO_2$ MIXED GAS SHIELDED ARC WELDING

BACKGROUND

Technical Field

The present invention relates to a flux-cored wire for Ar—$CO_2$ mixed gas shielded arc welding which provides excellent welding workability in all-position welding when steel used for a steel structure or the like is welded and weld metal having excellent characteristics such as low-temperature cracking resistance, low-temperature toughness, and fracture toughness (hereinafter, referred to as CTOD).

Related Art

As a flux-cored wire used for gas shielded arc welding using steel as a material to be welded, for example, a rutile type flux-cored wire or a basic flux-cored wire is known. Welding using the basic flux-cored wire can reduce an oxygen amount of weld metal, and therefore the weld metal has excellent low-temperature toughness and CTOD characteristic. However, welding using the basic flux-cored wire has poorer welding workability in all-position welding than welding using the rutile type flux-cored wire, and therefore is not often used generally.

On the other hand, gas shielded arc welding using the rutile type flux-cored wire provides extremely excellent welding efficiency and welding workability in all-position welding, and therefore is applied in a wide range of fields such as shipbuilding, bridges, oceanic structures, and steel frames.

However, the rutile type flux-cored wire is obtained by filling a flux mainly including a metal oxide such as $TiO_2$ into a steel outer skin, and therefore weld metal has a large amount of oxygen and does not easily obtain low-temperature toughness.

In addition, in these flux-cored wires, an amount of diffusion hydrogen is larger than that in a solid wire due to moisture included in a raw material of the flux or moisture absorption while the wire is stored. Therefore, there is a risk of low-temperature cracking of weld metal. It is necessary to perform preheating at about 100° C. when a thick steel plate is welded. This reduces a welding efficiency.

Various developments have been performed for a rutile type flux-cored wire of low-temperature steel. For example, JP 2009-61474 A discloses a technology for obtaining weld metal having excellent low-temperature toughness by reducing an oxygen amount of the weld metal while an amount of slag acting on welding workability is maintained by adding an alloy component which changes into a slag component during welding. However, in the technology described in JP 2009-61474 A, a shielding gas is CO2, and therefore the oxygen amount of the weld metal increases, sufficient low-temperature toughness or CTOD value is not obtained, and low-temperature cracking resistance is not taken into account even though high-temperature cracking resistance is secured.

JP 2008-87043 A also discloses a technology for obtaining weld metal having excellent low-temperature toughness. However, MgO added for reducing an oxygen amount of weld metal makes an arc unstable during welding, generates a large amount of spatters, and makes welding workability poor. In the technology disclosed in JP 2008-87043 A, low-temperature cracking resistance is not particularly taken into account.

JP 2009-248137 A discloses a rutile type flux-cored wire which provides excellent workability in all-position welding and weld metal having excellent low-temperature toughness. However, in the technology disclosed in JP 2009-248137 A, stabilization of low-temperature toughness is not sufficiently studied, and therefore an excellent CTOD value is not obtained disadvantageously.

JP 9-277087 A discloses a technology for obtaining excellent low-temperature toughness both in welding and in a heat treatment after welding by limiting contents of Nb, V, and P in a wire. However, also in the technology described in JP 9-277087 A, workability in all-position welding or a CTOD value is not sufficient disadvantageously.

SUMMARY

The present invention has been achieved in view of the above-described problems. An object of the present invention is to provide a flux-cored wire for Ar—$CO_2$ mixed gas shielded arc welding which provides excellent welding workability in all-position welding when steel used for a steel structure or the like is welded and weld metal having excellent low-temperature cracking resistance, low-temperature toughness, and CTOD characteristic.

The present inventors have variously made studied a rutile type flux-cored wire for gas shielded arc welding using an Ar—$CO_2$ mixture as a shielding gas in order to obtain excellent welding workability in all-position welding and weld metal having stable low-temperature toughness at −60° C., an excellent CTOD value at −30° C., and excellent low-temperature cracking resistance.

As a result, the present inventors have found that it is possible to obtain excellent welding workability in all-position welding and weld metal having excellent low-temperature toughness and CTOD value by forming the wire of a metal oxide mainly including $TiO_2$, a slag component including a fluorine compound containing Na and K, an optimum alloy component, and a chemical component containing a deoxidizer. In addition, the present inventors have found that it is possible to improve low-temperature cracking resistance also in weld metal having relatively high strength by eliminating a seam in a steel outer skin by welding a joint of the molded steel outer skin.

That is, the gist of the present invention exists in a flux-cored wire for Ar—$CO_2$ mixed gas shielded arc welding obtained by filling a flux into a steel outer skin, including, in terms of % by mass with respect to a total mass of the wire, as a total in the steel outer skin and the flux, 0.03 to 0.08% of C, 0.1 to 0.6% of Si, 1.2 to 2.5% of Mn, 0.01 to 0.5% of Cu, 0.5 to 1.5% of Ni, 0.05 to 0.5% of Ti, 0.002 to 0.015% of B, and 0.05% or less of Al, and further including, in terms of % by mass with respect to the total mass of the wire, in the flux, 4 to 8% of a Ti oxide in terms of $TiO_2$ in total, 0.1 to 0.6% of a Si oxide in terms of $SiO_2$ in total, 0.02 to 0.3% of an Al oxide in terms of $Al_2O_3$ in total, 0.1 to 0.8% of Mg, 0.05 to 0.3% of a fluorine compound in terms of F in total, 0.05 to 0.3% of one kind or two kinds of Na and K in the fluorine compound in terms of Na and K in total, 0.05 to 0.2% of one kind or two kinds of $Na_2O$ and $K_2O$ in total, and 0.2% or less of a Zr oxide in terms of $ZrO_2$ in total, the balance being Fe in the steel outer skin, iron powder, a Fe component of iron alloy powder, and inevitable impurities.

In addition, the gist of the present invention exists in a flux-cored wire for Ar—$CO_2$ mixed gas shielded arc welding characterized in eliminating a seam in the steel outer skin by welding a joint of the molded steel outer skin.

According to the flux-cored wire for Ar—$CO_2$ mixed gas shielded arc welding of the present invention, excellent welding workability in all-position welding is obtained, and weld metal having excellent low-temperature toughness at −60° C., an excellent CTOD value at −30° C., and excellent low-temperature cracking resistance is obtained. Therefore, according to the present invention, it is possible to improve a welding efficiency and a quality of the weld metal.

BRIEF DESCRIPTION OF DRAWING

FIG. 1 illustrates a groove shape in a joint test used in Examples of the present invention.

DETAILED DESCRIPTION

Hereinafter, compositions of components of the flux-cored wire for Ar—$CO_2$ mixed gas shielded arc welding according to an embodiment of the present invention, contents thereof, and a reason for limiting the compositions will be described. The content of each component will be represented by % by mass with respect to a total mass of the wire. The % by mass will be represented simply by %.

[C: 0.03 to 0.08% as a Total in Steel Outer Skin and Flux]

C contributes to stabilizing an arc during welding and improves strength of weld metal. However, when the content of C is less than 0.03%, the arc cannot be stabilized, and desired strength of the weld metal cannot be obtained sufficiently. When the content of C is more than 0.08%, C remains in the weld metal excessively, and therefore the strength of the weld metal becomes higher to reduce low-temperature toughness. Therefore, the content of C is set to be from 0.03 to 0.08% as a total in the steel outer skin and the flux. C can be added from metal powder, alloy powder, or the like in the flux in addition to a component included in the steel outer skin.

[Si: 0.1 to 0.6% as a Total in Steel Outer Skin and Flux]

Si partly becomes weld slag during welding, and thereby improves an appearance or a shape of a weld bead and contributes to improving welding workability. However, when the content of Si is less than 0.1%, the appearance or the shape of the weld bead cannot be improved sufficiently. When the content of Si is more than 0.6%, Si remains in the weld metal excessively to thereby reduce low-temperature toughness of the weld metal. Therefore, the content of Si is set to be from 0.1 to 0.6% as a total in the steel outer skin and the flux. Si can be added from metal Si or alloy powder such as Fe—Si or Fe—Si—Mn in the flux in addition to a component included in the steel outer skin.

[Mn: 1.2 to 2.5% as a Total in Steel Outer Skin and Flux]

Mn remains in the weld metal to thereby increase strength, low-temperature toughness, and a CTOD value of the weld metal. However, when the content of Mn is less than 1.2%, these effects cannot be obtained sufficiently. When the content of Mn is more than 2.5%, Mn remains in the weld metal excessively, and therefore the strength of the weld metal becomes excessively high to thereby reduce low-temperature toughness and a CTOD value of the weld metal. Therefore, the content of Mn is set to be from 1.2 to 2.5% as a total in the steel outer skin and the flux. Mn can be added from metal Mn or alloy powder such as Fe—Mn or Fe—Si—Mn in the flux in addition to a component included in the steel outer skin.

[Cu: 0.01 to 0.5% as a Total in Steel Outer Skin and Flux]

Cu makes a structure of the weld metal finer and increases low-temperature toughness and strength. However, when the content of Cu is less than 0.01%, these effects cannot be obtained sufficiently. When the content of Cu is more than 0.5%, the strength of the weld metal becomes excessively high to reduce low-temperature toughness. Therefore, the content of Cu is set to be from 0.01 to 0.5% as a total in the steel outer skin and the flux. Cu can be added from metal Cu or alloy powder such as Cu—Zr or Fe—Si—Cu in the flux in addition to a Cu plating component formed on a surface of the steel outer skin.

[Ni: 0.5 to 1.5% as a Total in Steel Outer Skin and Flux]

Ni improves low-temperature toughness and a CTOD value of the weld metal. However, when the content of Ni is less than 0.5%, this effect cannot be obtained sufficiently. When the content of Ni is more than 1.5%, high-temperature cracking is easily generated in the weld metal. Therefore, the content of Ni is set to be from 0.5 to 1.5% as a total in the steel outer skin and the flux. Ni can be added from metal Ni or alloy powder such as Fe—Ni in the flux in addition to a component included in the steel outer skin.

[Ti: 0.05 to 0.5% as a Total in Steel Outer Skin and Flux]

Ti makes the structure of the weld metal finer and improves low-temperature toughness and a CTOD value. However, when the content of Ti is less than 0.05%, this effect cannot be obtained sufficiently. When the content of Ti is more than 0.5%, an upper bainitic structure hindering toughness is generated to reduce toughness and the CTOD value. Therefore, the content of Ti is set to be from 0.05 to 0.5% as a total in the steel outer skin and the flux. Ti can be added from metal Ti or alloy powder such as Fe—Ti in the flux in addition to a component included in the steel outer skin.

[B: 0.002 to 0.015% as a Total in Steel Outer Skin and Flux]

A small amount of B added makes the microstructure of the weld metal finer and improves low-temperature toughness and the CTOD value of the weld metal. However, when the content of B is less than 0.002%, these effects cannot be obtained sufficiently. When the content of B is more than 0.015%, low-temperature toughness and the CTOD value of the weld metal are reduced, and high-temperature cracking is easily generated in the weld metal. Therefore, the content of B is set to be from 0.002 to 0.015%. B can be added from metal B, alloy powder such as Fe—B or Fe—Mn—B, or borax in the flux in addition to a component included in the steel outer skin.

[Al: 0.05% or Less as a Total in Steel Outer Skin and Flux]

Al remains in the weld metal as an oxide to reduce the toughness of the weld metal. Particularly when the content of Al is more than 0.05%, the toughness of the weld metal is significantly reduced. Therefore, the content of Al is set to be 0.05% or less. Al is not an essential element but the content thereof may be 0%.

[Total Content of Ti Oxide in Terms of $TiO_2$ in Flux: 4 to 8%]

A Ti oxide contributes to stabilizing an arc during welding, improves a shape of a weld bead, and contributes to improving welding workability. In addition, in vertical upward welding, the Ti oxide adjusts viscosity or a melting point of melted slag by being included in weld slag, and prevents melted metal from dripping. However, when a total content of the Ti oxide in terms of $TiO_2$ is less than 4%, these effects cannot be obtained sufficiently, the arc is unstable, a generation amount of spatters is large, and the shape of the weld bead is deteriorated. In addition, when the total content of the Ti oxide in terms of $TiO_2$ is less than 4%, the melted metal easily drips in vertical upward welding. When the total content of the Ti oxide in terms of $TiO_2$ is more than 8%, the arc is stable and a generation amount of spatters can be reduced. However, the Ti oxide remains excessively in the weld metal to thereby reduce low-temperature toughness. Therefore, the total content of the Ti oxide in terms of $TiO_2$ in the flux is set to be from 4 to 8%. The Ti oxide is added from rutile, titanium oxide, titanium slag, ilmenite, or the like in the flux.

[Total Content of Si Oxide in Terms of $SiO_2$ in Flux: 0.1 to 0.6%]

A Si oxide adjusts viscosity or a melting point of melted slag to improve a slag encapsulation property. However, when a total content of the Si oxide in terms of $SiO_2$ is less than 0.1%, the slag encapsulation property is deteriorated and an appearance of a bead is poor. When the total content of the Si oxide in terms of $SiO_2$ is more than 0.6%, a base degree of the melted slag is reduced, and an oxygen amount of the weld metal is thereby increased to reduce low-temperature toughness. Therefore, the total content of the Si oxide in terms of $SiO_2$ is set to be from 0.1 to 0.6%. The Si oxide can be added from silica sand, zircon sand, sodium silicate, or the like in the flux.

[Total Content of Al Oxide in Terms of $Al_2O_3$ in Flux: 0.02 to 0.3%]

An Al oxide adjusts viscosity or a melting point of melted slag during welding to prevent melted metal from dripping particularly in vertical upward welding. However, when a total content of the Al oxide in terms of $Al_2O_3$ is less than 0.02%, this effect cannot be obtained sufficiently, and the melted metal easily drips in vertical upward welding. When the total content of the Al oxide in terms of $Al_2O_3$ is more than 0.3%, the Al oxide remains excessively in the weld metal to thereby reduce low-temperature toughness. Therefore, the total content of the Al oxide in terms of $Al_2O_3$ is set to be from 0.02 to 0.3%. The Al oxide can be added from alumina or the like in the flux.

[Mg in Flux: 0.1 to 0.80]

Mg acts as a strong deoxidizer, and thereby reduces oxygen in the weld metal to increase low-temperature toughness and the CTOD value of the weld metal. However, when the content of Mg is less than 0.1%, these effects cannot be obtained sufficiently. When the content of Mg is more than 0.8%, Mg reacts vigorously with oxygen in an arc during welding to increase generation amounts of spatters and fumes. Therefore, the content of Mg is set to be from 0.1 to 0.8%. Mg can be added from metal Mg or alloy powder such as Al—Mg in the flux.

[Total Content of Fluorine Compound in Terms of F in Flux: 0.05 to 0.3%]

A fluorine compound stabilizes an arc. However, when a total content of the fluorine compound in terms of F is less than 0.05%, the arc cannot be stabilized sufficiently. When the total content of the fluorine compound in terms of F is more than 0.3%, the arc is unstable to increase a generation amount of spatters. In addition, when the total content of the fluorine compound in terms of F is more than 0.3%, melted metal easily drips in vertical upward welding. Therefore, the total content of the fluorine compound in terms of F is set to be from 0.05 to 0.3%. The fluorine compound can be added from $CaF_2$, NaF, LiF, $MgF_2$, $K_2SiF_6$, $Na_3AlF_6$, $AlF_3$, or the like. The content in terms of F is a total content of F included therein.

[Total Content of One Kind or Two Kinds of Na and K in Terms of Na and K in Fluorine Compound in Flux: 0.05 to 0.3%]

Na and K in the fluorine compound further reduce oxygen in the weld metal (such a reduction in oxygen cannot be performed only by Mg), and increase the low-temperature toughness and the CTOD value of the weld metal. However, when a total content of one kind or two kinds of Na and K in terms of Na and K in the fluorine compound is less than 0.05%, these effects cannot be obtained sufficiently. When the total content of one kind or two kinds of Na and K in terms of Na and K in the fluorine compound is more than 0.3%, the arc is rough to increase a generation amount of spatters. Therefore, the total content of one kind or two kinds of Na and K in terms of Na and K in the fluorine compound is set to be from 0.05 to 0.3%. Na and K in the fluorine compound can be added from NaF, $K_2SiF_6$, $Na_3AlF_6$, or the like. The content in terms of Na or K is a total content of Na or K included therein.

[Total Content of One Kind or Two Kinds of $Na_2O$ and $K_2O$ in Flux: 0.05 to 0.2%]

$Na_2O$ and $K_2O$ act as an arc stabilizer and a slag forming agent. When a total content of one kind or two kinds of $Na_2O$ and $K_2O$ is less than 0.05%, an arc is unstable to increase a generation amount of spatters, and an appearance of a bead is also poor. When the total content of one kind or two kinds of $Na_2O$ and $K_2O$ is more than 0.2%, slag detachability is poor, and metal easily drips in vertical upward welding. Therefore, the total content of one kind or two kinds of $Na_2O$ and $K_2O$ is set to be from 0.05 to 0.2%. $Na_2O$ and $K_2O$ can be added from a solid component of water glass including sodium silicate and potassium silicate, calcium titanate, sodium titanate, or the like.

[Total Content of Zr Oxide in Terms of $ZrO_2$ in Flux: 0.2% or Less]

A Zr oxide is added from zircon sand or a zirconium oxide. In addition, a small amount of the Zr oxide is included in a Ti oxide. However, the Zr oxide deteriorates slag detachability. Particularly when the content thereof is more than 0.2%, the slag detachability is significantly poor. Therefore, the total content of the Zr oxide in terms of $ZrO_2$ is set to be 0.2% or less.

[No Seam in Steel Outer Skin]

The flux-cored wire for Ar—$CO_2$ mixed gas shielded arc welding according to an embodiment of the present invention has a structure obtained by molding a steel outer skin into a pipe-like shape and filling a flux thereinto. The kind of the wire is roughly classified into a wire having no seam in a steel outer skin obtained by welding a joint of the molded steel outer skin, and a wire having a seam in a steel outer skin without welding the joint of the steel outer skin. In the present invention, any kind of wire can be employed. However, the wire having no seam in the steel outer skin is more preferable because the wire having no seam in the steel outer skin can be subjected to a heat treatment for reducing a total amount of hydrogen in the wire, a flux after manufacturing does not absorb moisture, and therefore it is possible to reduce an amount of diffusion hydrogen in the weld metal and to improve low-temperature cracking resistance.

The balance of the flux-cored wire for Ar—$CO_2$ mixed gas shielded arc welding to which the present invention is applied is Fe in the steel outer skin, iron powder added for adjusting components, a Fe component of iron alloy powder such as a Fe—Mn alloy or a Fe—Si alloy, and inevitable impurities. A flux filling ratio is not particularly limited, but is preferably from 8 to 20% with respect to the total mass of the wire from a viewpoint of productivity.

The shielding gas during welding is a mixed gas of Ar-5 to 25% $CO_2$ for reducing an oxygen amount of the weld metal.

EXAMPLES

Hereinafter, effects of the present invention will be described specifically with Examples.

By using JIS G3141 SPCC for a steel outer skin, the steel outer skin was molded into a U shape in a step of molding the steel outer skin. Thereafter, a wire having no seam obtained by welding a joint of the steel outer skin and a wire having a gap without welding were manufactured into pipe shapes and drawn to experimentally manufacture flux-cored wires having a wire diameter of 1.2 mm and containing various components, indicated in Tables 1 to 4.

TABLE 1

| | | component of wire (% by mass) | | | | | | | | | | | | |
|---|---|---|---|---|---|---|---|---|---|---|---|---|---|---|
| | | total in steel outer skin and flux | | | | | | | | flux | | | | |
| division | wire symbol | C | Si | Mn | Cu | Ni | Ti | B | Al | content in terms of $TiO_2$ | content in terms of $SiO_2$ | content in terms of $Al_2O_3$ | Mg | *content in terms of F |
| Examples of the present invention | W1 | 0.05 | 0.32 | 2.01 | 0.21 | 0.52 | 0.15 | 0.0055 | 0.01 | 5.56 | 0.22 | 0.03 | 0.28 | 0.11 |
| | W2 | 0.04 | 0.51 | 1.23 | 0.08 | 1.09 | 0.33 | 0.0038 | — | 7.05 | 0.46 | 0.18 | 0.46 | 0.23 |
| | W3 | 0.08 | 0.32 | 1.52 | 0.35 | 0.67 | 0.19 | 0.0114 | 0.02 | 4.87 | 0.14 | 0.09 | 0.38 | 0.09 |
| | W4 | 0.06 | 0.12 | 2.18 | 0.24 | 1.31 | 0.08 | 0.0088 | 0.01 | 6.59 | 0.52 | 0.16 | 0.54 | 0.27 |
| | W5 | 0.04 | 0.42 | 2.04 | 0.02 | 0.92 | 0.32 | 0.0069 | — | 6.84 | 0.33 | 0.21 | 0.13 | 0.14 |
| | W6 | 0.03 | 0.38 | 1.85 | 0.36 | 1.33 | 0.32 | 0.0107 | 0.03 | 5.27 | 0.18 | 0.07 | 0.75 | 0.19 |
| | W7 | 0.05 | 0.27 | 1.45 | 0.47 | 0.67 | 0.24 | 0.0045 | 0.02 | 7.16 | 0.26 | 0.11 | 0.35 | 0.21 |
| | W8 | 0.04 | 0.58 | 1.91 | 0.18 | 0.75 | 0.22 | 0.0092 | 0.03 | 4.09 | 0.58 | 0.23 | 0.66 | 0.08 |
| | W9 | 0.05 | 0.21 | 1.94 | 0.07 | 1.48 | 0.09 | 0.0113 | 0.02 | 6.55 | 0.34 | 0.15 | 0.27 | 0.22 |
| | W10 | 0.04 | 0.16 | 2.46 | 0.22 | 0.62 | 0.11 | 0.0035 | 0.01 | 6.91 | 0.21 | 0.26 | 0.19 | 0.15 |
| | W11 | 0.04 | 0.26 | 1.48 | 0.05 | 0.88 | 0.46 | 0.0046 | 0.03 | 7.18 | 0.45 | 0.09 | 0.55 | 0.13 |
| | W12 | 0.05 | 0.47 | 2.01 | 0.36 | 1.07 | 0.07 | 0.0138 | 0.01 | 5.92 | 0.39 | 0.17 | 0.42 | 0.23 |
| | W13 | 0.06 | 0.39 | 1.61 | 0.24 | 1.25 | 0.17 | 0.0074 | 0.04 | 4.99 | 0.31 | 0.22 | 0.36 | 0.18 |
| | W14 | 0.05 | 0.27 | 2.05 | 0.19 | 0.95 | 0.22 | 0.0024 | 0.01 | 6.78 | 0.45 | 0.07 | 0.47 | 0.14 |
| | W15 | 0.07 | 0.42 | 2.12 | 0.25 | 1.18 | 0.05 | 0.0062 | 0.02 | 7.55 | 0.38 | 0.12 | 0.55 | 0.06 |

*As a fluorine compound, one kind or two or more kinds of $CaF_2$, $AlF_3$, NaF, $K_2SiF_6$, $K_2ZrF_6$, and $Na_3AlF_6$ were used.

TABLE 2

| | | component of wire (% by mass) | | | | | | | | |
|---|---|---|---|---|---|---|---|---|---|---|
| | | flux | | | | | | | | |
| | | **in fluorine compound | | | | | | | | |
| division | wire symbol | content in terms of Na | content in terms of K | total content in terms of Na and K | $Na_2O$ | $K_2O$ | total of $Na_2O$ and $K_2O$ | content in terms of $ZrO_2$ | **others | seam of wire |
| Examples of the present invention | W1 | 0.12 | — | 0.12 | 0.04 | 0.07 | 0.11 | 0.05 | balance | present |
| | W2 | 0.15 | 0.06 | 0.21 | 0.09 | — | 0.09 | 0.14 | balance | absent |
| | W3 | — | 0.08 | 0.08 | 0.07 | 0.08 | 0.15 | 0.03 | balance | present |
| | W4 | 0.21 | 0.07 | 0.28 | 0.04 | 0.08 | 0.12 | 0.04 | balance | present |
| | W5 | 0.08 | 0.07 | 0.15 | — | 0.06 | 0.06 | 0.07 | balance | absent |
| | W6 | 0.11 | 0.07 | 0.18 | 0.09 | 0.05 | 0.14 | 0.05 | balance | absent |
| | W7 | 0.15 | 0.07 | 0.22 | — | 0.09 | 0.09 | 0.19 | balance | present |
| | W8 | — | 0.07 | 0.07 | 0.07 | 0.04 | 0.11 | 0.02 | balance | present |
| | W9 | 0.09 | 0.12 | 0.21 | 0.08 | 0.08 | 0.16 | 0.09 | balance | present |
| | W10 | 0.07 | 0.09 | 0.16 | 0.09 | 0.09 | 0.18 | 0.11 | balance | present |
| | W11 | 0.07 | 0.04 | 0.12 | 0.06 | 0.08 | 0.14 | 0.13 | balance | present |
| | W12 | 0.17 | 0.07 | 0.24 | 0.08 | — | 0.08 | 0.04 | balance | present |
| | W13 | 0.11 | 0.08 | 0.19 | 0.06 | 0.09 | 0.15 | 0.03 | balance | present |
| | W14 | 0.13 | — | 0.13 | 0.05 | 0.11 | 0.16 | 0.11 | balance | present |
| | W15 | 0.06 | — | 0.06 | 0.08 | — | 0.08 | 0.17 | balance | present |

**As Na and K in a fluorine compound, one kind or two or more kinds of NaF, $K_2SiF_6$, $K_2ZrF_6$, and $Na_3AlF_6$ were used.
***Others are Fe in a steel outer skin, iron powder, a Fe component of an iron alloy, and inevitable impurities.

TABLE 3

| | | component of wire (% by mass) | | | | | | | | | | | | |
|---|---|---|---|---|---|---|---|---|---|---|---|---|---|---|
| | | total in steel outer skin and flux | | | | | | | | total in steel outer skin and flux | | | | |
| division | wire symbol | C | Si | Mn | Cu | Ni | Ti | B | Al | content in terms of $TiO_2$ | content in terms of $SiO_2$ | content in terms of $Al_2O_3$ | Mg | *content in terms of F |
| Comparative Examples | W16 | 0.02 | 0.15 | 1.35 | 0.31 | 1.05 | 0.21 | 0.0075 | 0.02 | 5.81 | 0.41 | 0.08 | 0.04 | 0.09 |
| | W17 | 0.09 | 0.48 | 2.08 | 0.22 | 0.67 | 0.43 | 0.0048 | 0.03 | 4.95 | 0.22 | 0.15 | 0.44 | 0.18 |
| | W18 | 0.06 | 0.04 | 1.56 | 0.43 | 1.25 | 0.15 | 0.0035 | 0.01 | 6.67 | 0.23 | 0.37 | 0.15 | 0.12 |

TABLE 3-continued

| | | component of wire (% by mass) | | | | | | | | | | | | |
|---|---|---|---|---|---|---|---|---|---|---|---|---|---|---|
| | | | | | | | | | | total in steel outer skin and flux | | | | |
| division | wire symbol | total in steel outer skin and flux | | | | | | | | content in terms of TiO$_2$ | content in terms of SiO$_2$ | content in terms of Al$_2$O$_3$ | Mg | *content in terms of F |
| | | C | Si | Mn | Cu | Ni | Ti | B | Al | | | | | |
| | W19 | 0.04 | 0.65 | 1.94 | 0.29 | 0.69 | 0.25 | 0.0105 | 0.04 | 4.88 | 0.52 | 0.22 | 0.61 | 0.25 |
| | W20 | 0.04 | 0.32 | 1.26 | 0.32 | 0.87 | 0.16 | 0.0088 | 0.05 | 5.64 | 0.46 | 0.14 | 0.73 | 0.29 |
| | W21 | 0.06 | 0.42 | 2.57 | 0.17 | 1.14 | 0.42 | 0.0067 | 0.01 | 6.18 | 0.37 | 0.07 | 0.25 | 0.09 |
| | W22 | 0.04 | 0.29 | 1.31 | 0.004 | 1.08 | 0.18 | 0.0054 | 0.02 | 6.92 | 0.25 | 0.13 | 0.44 | 0.18 |
| | W23 | 0.07 | 0.41 | 2.13 | 0.55 | 1.22 | 0.41 | 0.0115 | 0.05 | 5.16 | 0.19 | 0.23 | 0.65 | 0.25 |
| | W24 | 0.05 | 0.38 | 1.95 | 0.18 | 0.44 | 0.13 | 0.0065 | 0.03 | 4.78 | 0.51 | 0.11 | 0.19 | 0.36 |
| | W25 | 0.05 | 0.27 | 1.76 | 0.35 | 1.56 | 0.22 | 0.0079 | 0.01 | 6.52 | 0.46 | 0.25 | 0.33 | 0.06 |
| | W26 | 0.07 | 0.49 | 1.92 | 0.28 | 0.92 | 0.02 | 0.0035 | 0.02 | 7.04 | 0.38 | 0.19 | 0.57 | 0.03 |
| | W27 | 0.03 | 0.16 | 1.35 | 0.16 | 0.55 | 0.56 | 0.0102 | 0.04 | 6.53 | 0.24 | 0.25 | 0.61 | 0.22 |
| | W28 | 0.05 | 0.33 | 1.96 | 0.07 | 1.07 | 0.18 | 0.0013 | 0.01 | 7.11 | 0.18 | 0.01 | 0.25 | 0.17 |
| | W29 | 0.05 | 0.42 | 2.02 | 0.12 | 0.59 | 0.29 | 0.0164 | 0.02 | 6.05 | 0.47 | 0.21 | 0.43 | 0.11 |
| | W30 | 0.06 | 0.41 | 1.95 | 0.29 | 1.11 | 0.08 | 0.0055 | 0.08 | 7.13 | 0.04 | 0.17 | 0.59 | 0.24 |
| | W31 | 0.05 | 0.45 | 2.04 | 0.09 | 0.85 | 0.19 | 0.0097 | 0.03 | 3.45 | 0.68 | 0.09 | 0.24 | 0.08 |
| | W32 | 0.05 | 0.28 | 1.68 | 0.17 | 1.03 | 0.31 | 0.0072 | 0.02 | 9.14 | 0.35 | 0.22 | 0.92 | 0.09 |

*As a fluorine compound, one kind or two or more kinds of CaF$_2$, AlF$_3$, NaF, K$_2$SiF$_6$, K$_2$ZrF$_6$, and Na$_3$AlF$_6$ were used.

TABLE 4

| | | component of wire (% by mass) | | | | | | | | |
|---|---|---|---|---|---|---|---|---|---|---|
| | | flux | | | | | | | | |
| | | **in fluorine compound | | | | | | | | |
| division | wire symbol | content in terms of Na | content in terms of K | total content in terms of Na and K | Na$_2$O | K$_2$O | total of Na$_2$O and K$_2$O | content in terms of ZrO$_2$ | ***others | seam of wire |
| Comparative Examples | W16 | 0.08 | — | 0.08 | 0.05 | 0.06 | 0.11 | 0.06 | balance | absent |
| | W17 | 0.09 | 0.07 | 0.16 | 0.08 | — | 0.08 | 0.07 | balance | present |
| | W18 | 0.09 | 0.02 | 0.11 | 0.08 | 0.07 | 0.15 | 0.09 | balance | absent |
| | W19 | 0.12 | 0.11 | 0.23 | 0.09 | 0.16 | 0.25 | 0.04 | balance | absent |
| | W20 | 0.24 | 0.12 | 0.36 | 0.07 | — | 0.07 | 0.08 | balance | absent |
| | W21 | 0.07 | — | 0.07 | — | 0.08 | 0.08 | 0.12 | balance | present |
| | W22 | 0.06 | 0.09 | 0.15 | 0.05 | 0.08 | 0.13 | 0.28 | balance | absent |
| | W23 | 0.08 | 0.04 | 0.22 | 0.08 | 0.09 | 0.17 | 0.04 | balance | present |
| | W24 | 0.15 | 0.13 | 0.28 | 0.08 | — | 0.08 | 0.05 | balance | absent |
| | W25 | 0.03 | — | 0.03 | 0.04 | 0.08 | 0.12 | 0.06 | balance | absent |
| | W26 | — | 0.05 | 0.05 | 0.07 | 0.07 | 0.14 | 0.11 | balance | absent |
| | W27 | 0.09 | 0.09 | 0.18 | — | 0.02 | 0.02 | 0.12 | balance | absent |
| | W28 | 0.11 | 0.02 | 0.13 | 0.05 | 0.11 | 0.16 | 0.05 | balance | absent |
| | W29 | — | 0.08 | 0.08 | 0.03 | 0.06 | 0.09 | 0.07 | balance | absent |
| | W30 | 0.11 | 0.08 | 0.19 | 0.04 | 0.08 | 0.12 | 0.15 | balance | absent |
| | W31 | — | 0.06 | 0.06 | 0.05 | 0.08 | 0.13 | 0.02 | balance | absent |
| | W32 | 0.06 | — | 0.06 | — | 0.08 | 0.08 | 0.16 | balance | absent |

**As Na and K in a fluorine compound, one kind or two or more kinds of NaF, K$_2$SiF$_6$, K$_2$ZrF$_6$, and Na$_3$AlF$_6$ were used.
***Others are Fe in a steel outer skin, iron powder, a Fe component of an iron alloy, and inevitable impurities.

For the experimentally manufactured wires, welding workability was evaluated by vertical upward fillet welding using a steel plate defined by JIS G 3126 SLA 365, and mechanical properties were evaluated by a welding cracking test and a deposited metal test. In addition, for some experimentally manufactured wires, a welding joint test was performed by vertical upward welding using a K groove illustrated in FIG. 1 to perform a CTOD test. In this K groove, a groove angle was set to 45°, a groove depth on a surface side was set to 23 mm, and a groove depth on a back side was set to 35 mm. These welding conditions are indicated in Table 5.

TABLE 5

| test item | welding position | plate thickness (mm) | welding method | shielding gas | groove | current (A) | voltage (V) | welding speed (cm/min) |
|---|---|---|---|---|---|---|---|---|
| evaluation of welding workability | vertical upward | 12 | semi-automatic MAG | Ar—20%$CO_2$ 25 L/minute | T type fillet | 210 | 23 | approximately 10 |
| deposited metal test | downward | 20 | automatic MAG | | in conformity with JIS Z 3111 | 270 | 29 | 30 |
| welding cracking test | downward | 40 | automatic MAG | | 20° on one side U groove | 240 | 26 | 22 |
| welding joint test (CTOD) | vertical upward | 60 | semi-automatic MAG | | FIG. 1 (K groove) | 190 to 220 | 21 to 25 | 19 to 23 |

Evaluation of welding workability by vertical upward welding was performed by examining stability of an arc, generation states of spatters and fumes, an appearance and a shape of a bead, dripping conditions of melted metal, and presence of high-temperature cracking.

The welding cracking test was performed in conformity with a U shape welding cracking test method (JIS Z 3157) at a preheated temperature of a test body of 75° C. Presence of surface cracking or cross section cracking (five cross sections) of the test body 58 hours after welding was examined by penetrant testing (JIS Z 2343).

The deposited metal test was performed by welding in conformity with JIS Z 3111. Test pieces for a tensile test (No. A1) and an impact test (V notch test piece) were collected from a center part of deposited metal in a plate thickness direction to perform a mechanical test. In evaluation of tensile strength, a test piece having tensile strength of 570 to 680 MPa was evaluated as being excellent. Evaluation of toughness was performed by a Charpy impact test at −60° C. The Charpy impact test was performed repeatedly for each test piece, and a test piece having an average of three absorption energies of 60 J or more was evaluated as being excellent.

In the welding joint test, a back side of the K groove illustrated in FIG. 1 was welded, and then the groove was subjected to back chipping of a radius of 6 mm and a groove angle of 45° from a steel plate surface to a depth of 34 mm, and a surface side was welded. For evaluation of a CTOD value by the welding joint test, a CTOD test piece was collected in conformity with BS (British standard) 5762, and three tests were performed repeatedly at a test temperature of −30° C. A test piece having a minimum CTOD value of 0.5 mm or more was evaluated as being excellent. These results are indicated in Table 6 collectively.

TABLE 6

| division | wire symbol | test results of welding workability | results of U type cracking test presence of cracks | results of mechanical test TS (MPa) | vE-60 (J) | CTOD value −30° C. (mm) | total evaluation |
|---|---|---|---|---|---|---|---|
| Examples of the present invention | W1 | excellent | absent | 605 | 72 | 0.81 | ◯ |
| | W2 | excellent | absent | 608 | 79 | — | ◯ |
| | W3 | excellent | absent | 636 | 82 | 0.64 | ◯ |
| | W4 | excellent | absent | 626 | 96 | — | ◯ |
| | W5 | excellent | absent | 659 | 84 | — | ◯ |
| | W6 | excellent | absent | 656 | 98 | 0.75 | ◯ |
| | W7 | excellent | absent | 609 | 92 | 0.81 | ◯ |
| | W8 | excellent | absent | 627 | 84 | — | ◯ |
| | W9 | excellent | absent | 604 | 101 | — | ◯ |
| | W10 | excellent | absent | 613 | 87 | 1.02 | ◯ |
| | W11 | excellent | absent | 655 | 82 | — | ◯ |
| | W12 | excellent | absent | 613 | 76 | — | ◯ |
| | W13 | excellent | absent | 611 | 81 | — | ◯ |
| | W14 | excellent | absent | 640 | 86 | 0.67 | ◯ |
| | W15 | excellent | absent | 637 | 75 | — | ◯ |
| Comparative Examples | W16 | unstable arc | absent | 521 | 51 | 0.19 | X |
| | W17 | excellent | present | 750 | 54 | — | X |
| | W18 | poor appearance and shape of bead | absent | 621 | 48 | — | X |
| | W19 | poor slag detachability dripping of metal | absent | 656 | 42 | — | X |
| | W20 | a large amount of spatters | absent | 535 | 49 | 0.24 | X |
| | W21 | excellent | present | 748 | 55 | 0.28 | X |
| | W22 | poor slag detachability | absent | 539 | 56 | — | X |
| | W23 | excellent | present | 747 | 39 | — | X |
| | W24 | unstable arc, a large amount of spatters dripping of metal | absent | 582 | 35 | 0.17 | X |

TABLE 6-continued

| division | wire symbol | test results of welding workability | results of U type cracking test presence of cracks | TS (MPa) | vE-60 (J) | CTOD value −30° C. (mm) | total evaluation |
|---|---|---|---|---|---|---|---|
| | W25 | crater cracking | absent | 672 | 55 | 0.25 | X |
| | W26 | unstable arc | absent | 615 | 37 | 0.18 | X |
| | W27 | unstable arc, a large amount of spatters poor appearance of bead | absent | 679 | 46 | 0.27 | X |
| | W28 | dripping of metal | absent | 637 | 35 | 0.19 | X |
| | W29 | crater cracking | absent | 675 | 41 | 0.22 | X |
| | W30 | poor appearance of bead | absent | 632 | 53 | — | X |
| | W31 | unstable arc, a large amount of spatters dripping of metal | absent | 647 | 48 | — | X |
| | W32 | a large amount of spatters a large amount of fumes | absent | 665 | 51 | — | X |

Wire symbols W1 to W15 in Tables 1, 2, and 6 represent Examples of the present invention, and wire symbols W16 to W32 in Tables 3, 4, and 6 represent Comparative Examples. The wire symbols W1 to W15 as Examples of the present invention had compositions of components within a range defined in the present invention. Therefore, the wire symbols W1 to W15 had excellent welding workability, no crack in a U type cracking test, and excellent tensile strength and absorption energy in a deposited metal test. That is, the wire symbols W1 to W15 obtained extremely satisfactory results. The wire symbols W1, W3, W6, W7, W10, and W14 which had been subjected to a welding joint test obtained excellent CTOD values.

The wire symbol W16 in Comparative Examples included a small amount of C. Therefore, in the wire symbol W16, an arc was unstable and the tensile strength of deposited metal was low. In addition, the wire symbol W16 included a small amount of Mg. Therefore, in the wire symbol W16, the absorption energy of the deposited metal was low and a CTOD value in the welding joint test was low.

The wire symbol W17 included a large amount of C. Therefore, in the wire symbol W17, the tensile strength of deposited metal was high and the absorption energy was low. In addition, in the wire symbol W17, there was a seam in a steel outer skin and the tensile strength of the deposited metal was high, and therefore a crack was generated in a welded part in the U type cracking test.

The wire symbol W18 included a small amount of Si. Therefore, in the wire symbol W18, an appearance and a shape of a bead were poor. In addition, the wire symbol W18 included a large amount of an Al oxide in terms of $Al_2O_3$. Therefore, in the wire symbol W18, the absorption energy of deposited metal was low.

The wire symbol W19 included a large amount of Si. Therefore, in the wire symbol W19, the absorption energy of deposited metal was low. In addition, the wire symbol W19 included a large amount of $Na_2O$ and $K_2O$ in total. Therefore, in the wire symbol W19, slag detachability was poor and metal dripped.

The wire symbol W20 included a small amount of Mn. Therefore, in the wire symbol W20, the tensile strength of deposited metal was low and the absorption energy was low. In addition, a CTOD value in the welding joint test was low. Furthermore, the wire symbol W20 included a large amount in terms of Na and K in the fluorine compound. Therefore, in the wire symbol W20, a generation amount of spatters was large.

The wire symbol W21 included a large amount of Mn. Therefore, in the wire symbol W21, the tensile strength of deposited metal was high and the absorption energy was low. In addition, in the wire symbol W17, there was a seam in a steel outer skin and the tensile strength of the deposited metal was high, and therefore a crack was generated in a welded part in the U type cracking test. In addition, a CTOD value in the welding joint test was low.

The wire symbol W22 included a small amount of Cu. Therefore, in the wire symbol W22, the tensile strength of deposited metal was low and the absorption energy was low. In addition, the wire symbol W22 included a large amount of a Zr oxide in terms of $ZrO_2$. Therefore, in the wire symbol W22, slag detachability was poor.

The wire symbol W23 included a large amount of Cu. Therefore, in the wire symbol W23, the tensile strength of deposited metal was high and the absorption energy was low. In addition, in the wire symbol W17, there was a seam in a steel outer skin and the tensile strength of the deposited metal was high, and therefore a crack was generated in a welded part in the U type cracking test.

The wire symbol W24 included a small amount of Ni. Therefore, in the wire symbol W24, the absorption energy of deposited metal was low and a CTOD value in the welding joint test was low. In addition, the wire symbol W24 included a large amount of a fluorine compound in terms of F. Therefore, in the wire symbol W24, an arc was unstable, a generation amount of spatters was large, and metal dripped.

The wire symbol W25 included a large amount of Ni. Therefore, in the wire symbol W25, high-temperature cracking was generated in a crater part. In addition, the wire symbol W25 included a small amount in terms of Na and K in the fluorine compound. Therefore, in the wire symbol W25, the absorption energy of deposited metal was low and a CTOD value in the welding joint test was low.

The wire symbol W26 included a small amount of Ti. Therefore, in the wire symbol W26, the absorption energy of deposited metal was low and a CTOD value in the welding joint test was low. In addition, the wire symbol W26 included a small amount of a fluorine compound in terms of F. Therefore, in the wire symbol W26, an arc was unstable.

The wire symbol W27 included a large amount of Ti. Therefore, in the wire symbol W27, the absorption energy of deposited metal was low and a CTOD value in the welding joint test was low. In addition, the wire symbol W27 included a large amount of $Na_2O$ and $K_2O$ in total. Therefore, in the wire symbol W27, an arc was unstable, a generation amount of spatters was large, and an appearance of a bead was poor.

The wire symbol W28 included a small amount of B. Therefore, in the wire symbol W28, the absorption energy of deposited metal was low and a CTOD value in the welding joint test was low. In addition, the wire symbol W28 included a small amount of an Al oxide in terms of $Al_2O_3$. Therefore, in the wire symbol W28, metal dripped.

The wire symbol W29 included a large amount of B. Therefore, in the wire symbol W29, high-temperature cracking was generated in a crater part and the absorption energy of deposited metal was low. In addition, a CTOD value in the welding joint test was low.

The wire symbol W30 included a large amount of Al. Therefore, in the wire symbol W30, the absorption energy of deposited metal was low. In addition, the wire symbol W30 included a small amount of a Si oxide in terms of $SiO_2$. Therefore, in the wire symbol W30, a slag encapsulation property was poor and an appearance of a bead was poor.

The wire symbol W31 included a small amount of a Ti oxide in terms of $TiO_2$. Therefore, in the wire symbol W31, an arc was unstable, a generation amount of spatters was large, and metal dripped. In addition, the wire symbol W31 included a large amount of a Si oxide in terms of $SiO_2$. Therefore, in the wire symbol W31, the absorption energy of deposited metal was low.

The wire symbol W32 included a large amount of a Ti oxide in terms of $TiO_2$. Therefore, in the wire symbol W32, the absorption energy of deposited metal was low. In addition, the wire symbol W32 had a large amount of Mg. Therefore, in the wire symbol W32, generation amounts of spatters and fumes were large.

FIG. 1
BACK SIDE
SURFACE
[Table 1]
division
wire symbol
component of wire (% by mass)
total in steel outer skin and flux
lux
content in terms of $TiO_2$
content in terms of $SiO_2$
content in terms of $Al_2O_3$
content in terms of F
Examples of the present invention
*As a fluorine compound, one kind or two or more kinds of $CaF_2$,
$AlF_3$, NaF, $K_2SiF_6$, $K_2ZrF_6$, and $Na_3AlF_6$ were used.
[Table 2]
division
wire symbol
component of wire (% by mass)
flux
in fluorine compound
content in terms of Na
content in terms of K
total content in terms of Na and K
total of $Na_2O$ and $K_2O$
content in terms of $ZrO_2$
others
seam of wire
Examples of the present invention
balance
present
absent
**As Na and K in a fluorine compound, one kind or two or more kinds of NaF, $K_2SiF_6$, $K_2ZrF_6$, and $Na_3AlF_6$ were used.
***Others are Fe in a steel outer skin, iron powder, a Fe component of an iron alloy, and inevitable impurities.
[Table 3]
division
wire symbol
component of wire (% by mass)
total in steel outer skin and flux
flux
content in terms of $TiO_2$
content in terms of $SiO_2$
content in terms of $Al_2O_3$
content in terms of F
Comparative Examples
*As a fluorine compound, one kind or two or more kinds of $CaF_2$, $AlF_3$, NaF, $K_2SiF_6$, $K_2ZrF_6$, and $Na_3AlF_6$ were used.
[Table 4]
division
wire symbol
component of wire (% by mass)
flux
in fluorine compound
content in terms of Na
content in terms of K
total content in terms of Na and K
total content of $Na_2O$ and $K_2O$
content in terms of $ZrO_2$
others
seam of wire
Comparative Examples
balance
present
absent
**As Na and K in a fluorine compound, one kind or two or more kinds of NaF, $K_2SiF_6$, $K_2ZrF_6$, and $Na_3AlF_6$ were used.
***Others are Fe in a steel outer skin, iron powder, a Fe component of an iron alloy, and inevitable impurities.
[Table 5]
test item
evaluation of welding workability
deposited metal test
welding cracking test
welding joint test
welding position
vertical upward
downward
plate thickness
welding method
semi-automatic
automatic

What is claimed is:

1. A flux-cored wire for Ar—$CO_2$ mixed gas shielded arc welding obtained by filling a flux into a steel outer skin, comprising:

in terms of % by mass with respect to a total mass of the flux-cored wire, as a total in the steel outer skin and the flux, 0.03 to 0.08% of C;
0.1 to 0.6% of Si;
1.2 to 2.5% of Mn;
0.01 to 0.5% of Cu;
0.5 to 1.5% of Ni;
0.05 to 0.5% of Ti;
0.002 to 0.015% of B; and
0.05% or less of Al, and further comprising:

in terms of % by mass with respect to the total mass of the flux-cored wire, in the flux, 4 to 8% of a Ti oxide in terms of $TiO_2$ in total;
0.1 to 0.6% of a Si oxide in terms of $SiO_2$ in total;
0.02 to 0.3% of an Al oxide in terms of $Al_2O_3$ in total;
0.1 to 0.8% of Mg;
0.05 to 0.3% of at least one fluorine compound in terms of F in total;
one or both of Na and K in the at least one fluorine compound, in an amount of 0.05 to 0.3% in terms of Na and K in total;
one or both of $Na_2O$ and $K_2O$, in an amount of 0.05 to 0.2% in terms of the one or both $Na_2O$ and $K_2O$ in total; and
0.2% or less of a Zr oxide in terms of $ZrO_2$ in total,
a remaining balance being Fe in the steel outer skin, iron powder, a Fe component of iron alloy powder, and inevitable impurities.

2. The flux-cored wire for Ar—$CO_2$ mixed gas shielded arc welding according to claim 1, wherein a seam in the steel outer skin is eliminated by welding a joint of a molded steel outer skin.

* * * * *